(12) United States Patent
Dupaquis

(10) Patent No.: US 6,718,536 B2
(45) Date of Patent: Apr. 6, 2004

(54) COMPUTER-IMPLEMENTED METHOD FOR FAST GENERATION AND TESTING OF PROBABLE PRIME NUMBERS FOR CRYPTOGRAPHIC APPLICATIONS

(75) Inventor: Vincent Dupaquis, Peypin (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 10/176,497

(22) Filed: Jun. 21, 2002

(65) Prior Publication Data

US 2003/0235299 A1 Dec. 25, 2003

(51) Int. Cl.⁷ ................................................. G06F 9/45
(52) U.S. Cl. ........................ 717/126; 380/30; 708/254; 708/677
(58) Field of Search ..................... 380/28, 30; 708/250, 708/254, 677; 717/126

(56) References Cited

U.S. PATENT DOCUMENTS

| | | | | |
|---|---|---|---|---|
| 4,351,982 A | | 9/1982 | Miller et al. .................. 380/30 |
| 4,780,840 A | | 10/1988 | Van Den Ende ............ 708/250 |
| 4,944,007 A | * | 7/1990 | Austin ........................ 713/180 |
| 5,432,852 A | * | 7/1995 | Leighton et al. .............. 380/30 |
| 5,872,917 A | * | 2/1999 | Hellman ..................... 713/202 |
| 6,081,598 A | * | 6/2000 | Dai ............................. 380/28 |
| 6,307,938 B1 | * | 10/2001 | Matyas et al. ................ 380/44 |
| 6,330,332 B1 | * | 12/2001 | Itoh et al. ..................... 380/28 |
| 6,334,190 B1 | * | 12/2001 | Silverbrook et al. ........ 713/500 |
| 6,411,715 B1 | * | 6/2002 | Liskov et al. ............... 380/277 |
| 2002/0034300 A1 | * | 3/2002 | Thuvesholmen et al. ... 380/256 |
| 2002/0067832 A1 | * | 6/2002 | Jablon ........................ 380/277 |
| 2002/0099746 A1 | * | 7/2002 | Tie et al. ..................... 708/254 |
| 2002/0136401 A1 | * | 9/2002 | Hoffstein et al. ............. 380/30 |
| 2002/0186837 A1 | * | 12/2002 | Hopkins et al. .............. 380/28 |

OTHER PUBLICATIONS

J. Brandt et al., "On Generation of Probable Primes by Incremental Search", paper of Aarhus University, pp. 358–370.

P. Beauchemin et al., "The Generation of Random Numbers That Are Probably Prime", J. Cryptology, 1988, vol. 1, pp. 53–64.

Paper of P. Milhailescu, "Technique for Generating Provable Primes", 4 pages.

* cited by examiner

*Primary Examiner*—John Chavis
(74) *Attorney, Agent, or Firm*—Thomas Schneck; Mark Protsik

(57) ABSTRACT

A computer program provides fast generation and testing of probable prime numbers for cryptographic applications. The program instructions executed on computer hardware execute steps that include a smart increment program function that finds successive candidates using a table of congruent values that are relatively prime to a selected set of very small primes do identify an increment to the next candidate, thereby sieving out about ¾ths of the really obvious components that don't need to be subjected to trial division. The program instructions also include a small primes testing program function that speeds trial division against a list of small primes by carrying out the division on modular reduced values rather than the very large candidates themselves. Only the about 10% of the candidates that pass the small primes test will then be subjected to more rigorous, but time consuming, probable primality tests.

14 Claims, No Drawings

COMPUTER-IMPLEMENTED METHOD FOR FAST GENERATION AND TESTING OF PROBABLE PRIME NUMBERS FOR CRYPTOGRAPHIC APPLICATIONS

TECHNICAL FIELD

The present invention relates to cryptography, including such basic cryptographic components as prime number generation, key generation and pseudo-random number generation. The invention relates in particular to computer software cryptography methods and corresponding programmed hardware apparatus performing prime number generation and testing of generated candidates for probable primality, with particular emphasis on speed.

BACKGROUND ART

Large prime or probable prime numbers are useful for a variety of cryptographic applications. For example, prime numbers are used in generating key pairs in a public key cryptography system (such as RSA). Further, a pseudo-random number sequence can be generated using primes, as in U.S. Pat. No. 4,780,840 to Van Den Ende. Such sequences could in turn be used in stream ciphers for secret communications.

As the required size of the probable primes in these types of applications increases, an efficient way for the programmed computer system or chip involved in a cryptography method to quickly generate such primes becomes extremely important. In many applications it would be desirable, for added security and flexibility, that the large random prime numbers be generated immediately before use, rather than relying on a set of stored pre-computed prime values. Unfortunately, a difficulty in large prime number generation resides in the fact that probable prime candidates have to be tested through algorithms (such as Miller-Rabin or Fermat) that are time consuming or need a large amount of computing power or both. Techniques that quickly eliminate unlikely candidates would minimize the number of times that such rigorous tests need to be carried out before a probable prime is identified.

In U.S. Pat. No. 4,351,982, Miller et al. disclose generating a sequence of prime numbers, beginning with a known prime, by incrementing from a preceding prime P in the sequence to a new value hP +1 (h being random) and then testing the new value for primality. Any time a value is found to be composite, h is incremented by 2 and a new hP +1 is tested. Once a value hP +1 is found to be prime, it is used as the new prime P for the next search.

P. Mihailescu, in an article entitled "Technique for Generating Probable Primes", IEEE P1963 submission (1994), describes a sieving method for generating prime numbers that are of the form $N=2*(t+k)*Q+1$, where the incremental search for prime candidates is done by increasing k in some manner.

J. Brandt et al, in the article "On Generation of Probable Primes by Incremental Search", *Advances in Cryptology—Crypto '92*, Springer-Verlag (1993), pp. 358–370, describes an incremental search for candidates for primality testing. Here the increment for generating new candidates from the previous test candidate is always 2.

An object of the invention is to provide a computer software (or firmware) method by which a computer system or chip programmed with such software can efficiently eliminate unlikely candidates for probable primality testing so that probable primes useful for cryptographic applications such as key generation can be quickly generated and tested.

Another object of the invention is to provide a cryptographic apparatus in the form of a programmed computer system or configured processing chip that executes the aforementioned probable prime generation and testing method.

DISCLOSURE OF THE INVENTION

The above objects are met by a method and apparatus that implement a smart incrementation and small primes testing technique wherein successive candidates, beginning with a randomly generated first large candidate, which are relatively prime to very small primes (e.g., 2, 3, 5 and 7) are modularly reduced and tested against a specified set of small primes (e.g, primes from 11 through 241) until a likely candidate is identified for more rigorous probable primality testing.

The smart increment program function finds successive integer candidates by identifying an increment (not necessarily 2) to the next candidate, using a table of congruent values that are relatively prime to the selected very small primes modulus the product of the selected very small primes (e.g., mod 210). The table keeps the form of the primes eventually found by the method unknown, which is strongly desired for cryptographic security. It immediately sieves out about three-fourths of the really obvious composites so that only the remaining candidates known to be relatively prime to the very small primes are subjected to trial division in the program's small primes testing function. Use of the table also allows an increment to be found without trial division by the large integer candidates themselves.

The small primes test program function carries out trial division against a list of small primes. However, the speed of this program is increased by doing the trial division on a set of modular reduced values rather than on the very large candidates themselves (e.g, of 32 bit size instead of 1024 bits). The reduction moduli are size-limited products (e.g., at most 32 bits) of groups of the same small primes against which the candidate will be tested.

Only candidates that pass the small primes test (about ten percent of the total number of integers in any given range) will be subjected to the more rigorous probable primality test(s) like Miller-Rabin or Fermat.

BEST MODE OF CARRYING OUT THE INVENTION

The present invention is a computer-implemented method for generating and testing of large (typically 256, 324, 512, 1024 bits or larger) probable prime numbers for cryptographic use. The method is preferably implemented as software code stored on and read from a computer-readable medium and executed by a general-purpose programmable computer system. It might also be implemented as firmware in a special-purpose cryptographic computer chip (e.g., on a smart card), or even as configurable hardware (e.g., an FPGA chip) or application-specific circuitry (i.e., an ASIC chip) specifically programmed or designed to execute the steps of the method in its circuitry. Cryptographic uses for probable prime numbers include generating of keys, as in asymmetric (public-private key pair) encryption programs. Another cryptographic use for probable primes is for pseudo-random number generation, e.g. for stream cipher communications. The method of the present invention will typically be one part of a larger cryptographic computer program in which the large probable primes generated by the method are used. The computer system or special-purpose chip, when programmed to execute the method of the present invention can be considered, at that time, to be a prime number generating circuit or device.

The present method increases the speed of finding a probable prime by using a smart increment technique to avoid having to test unlikely candidates. A random number of the desired bit size (e.g., 1024 bits) is chosen and immediately incremented to a value that is relatively prime to the very small primes 2, 3, 5 and 7 to produce the initial candidate. Each candidate is tested by the programmed computer system or chip, beginning with trial integer division using a list of small primes, and if found to be composite is incremented by a selected even number (not necessarily two), to obtain the next candidate that is relatively prime to the very small primes 2, 3, 5 and 7. The present method uses this smart increment technique to minimize the number of composite numbers that are tested by integer division. The trial divisions are not conducted directly upon the large candidate number, but upon 32-bit modular reductions of the candidate, further speeding up the method. When a candidate is found that passes the small primes trial division test, the likely candidate is then tested using one or more known rigorous probable prime testing algorithms, such as the Miller-Rabin test or the Fermat test. As these latter tests are more time consuming (e.g., both of the above-named tests employ modular exponentiation), only those likely candidates found to be relatively prime against the small primes in the integer division test are subjected to the more rigorous tests.

The main part of the computer program may include the following:

```
MainIncrement := SmartIncrement(true);
AleaIsComposite := SmallPrimesTest(true);
Label Generate_Candidate
While (AleaIsComposite = true) do
    Begin
        LocalIncrement := SmartIncrement(false);
        MainIncrement := MainIncrement + LocalIncrement;
        For Counter := 0 to MAX_MODULI - 1 do
            Begin
                Table_Mod[Counter] := (Table_Mod[Counter] +
                    LocalIncrement) % Table_Reductions[Counter];
            End;
        AleaIsComposite := SmallPrimesTest(false);
    End;
Alea := Alea + MainIncrement;
If (not Number_Is_Probably_Prime(Alea)) then
    Begin
        AleaIsComposite := true;
        Goto Generate_Candidate;
    End;
```

In this program, "Alea" is the name of the randomly selected candidate integer to be tested. Any random or pseudo-random number generating routine capable of rapidly producing a very large odd-number candidate of the requisite size could be used. "SmallPrimesTest" and "SmartIncrement" are functions, described in more detail below, that carry out the integer division test against a list of small prime numbers and the smart incrementation technique of the present invention, respectively. At the end, we obtain a number, which is relatively prime to the small prime numbers tested (AleaIsComposite=false). Then, any one or more of the rigorous classical primality testing methods, which are available can be employed on that number (represented by the function call "Number_Is_Probably_Prime").

However, such rigorous tests are only carried out on those candidates that first pass the "SmallPrimesTest". (About 90% of the possible candidates are eliminated as proven composites by means of the SmartIncrement and SmallPrimesTest functions, so that the more rigorous testing is only performed on the remaining 10% of candidate values.) If the candidate fails the chosen rigorous primality test(s) then a new candidate is generated where the main program left off.

The SmartIncrement function uses the following table:

```
Table_210[210] = {0, 1, 0, 0, 0, 0, 0, 0, 0, 0, 0, 11, 0,
13, 0, 0, 0, 17, 0, 19, 0, 0, 0, 23, 0, 0, 0, 0, 0, 29,
0, 31, 0, 0, 0, 0, 0, 37, 0, 0, 0, 41, 0, 43, 0, 0, 0,
47, 0, 0, 0, 0, 0, 53, 0, 0, 0, 0, 0, 59, 0, 61, 0, 0, 0,
0, 0, 67, 0, 0, 0, 71, 0, 73, 0, 0, 0, 0, 0, 79, 0, 0, 0,
83, 0, 0, 0, 0, 0, 89, 0, 0, 0, 0, 0, 0, 0, 97, 0, 0, 0,
101, 0, 103, 0, 0, 0, 107, 0, 109, 0, 0, 0, 113, 0, 0, 0,
0, 0, 119, 0, 121, 0, 0, 0, 0, 0, 127, 0, 0, 0, 131, 0,
0, 0, 0, 0, 137, 0, 139, 0, 0, 0, 143, 0, 0, 0, 0, 0,
149, 0, 151, 0, 0, 0, 0, 0, 157, 0, 0, 0, 0, 0, 163, 0,
0, 0, 167, 0, 169, 0, 0, 0, 173, 0, 0, 0, 0, 0, 179, 0,
181, 0, 0, 0, 0, 0, 187, 0, 0, 0, 191, 0, 193, 0, 0, 0,
0, 0, 199, 0, 0, 0, 0, 0, 0, 0, 0, 0, 209}
```

Table_210 consists of zeros for all entries that divisible by 2, 3, 5 or 7. But for entries that are relatively prime to 2, 3, 5 and 7, the table has non-zero values, e.g. the integers themselves. Other ways of distinguishing between elements representing divisible and relatively prime values in the table could also be used. The table helps SmartIncrement choose a candidate that is relatively prime to 2, 3, 5, and 7, for further integer division testing using the SmallPrimesTest function.

The SmartIncrement function may comprise the following program steps.

```
Function SmartIncrement (FirstCall: boolean) : integer
Var Increment : integer;
Begin
    If (FirstCall = true) then
        Begin
            Mod_210 := Alea % 210;
            Increment := 0;
        End
    Else Begin
        Mod_210 := (Mod_210 + 2) % 210;
        Increment := 2;
    End;
    While (Table_210[Mod_210] = 0) do
        Begin
            Mod_210 := (Mod_210 + 2) % 210;
            Increment := Increment + 2;
        End;
    Return (Increment);
End;
```

This embodiment of SmartIncrement ensures that each subsequent candidate is indivisible by 2, 3, 5 and 7. Alea is not used directly. Rather, calculations of Increment are made based on Alea % 210 (i.e., the modular remainder). The function steps through Table_210 until it finds the next value for Mod_210 (congruent to the corresponding value Alea+Increment) that is non-zero, i.e. relatively prime to 2, 3, 5, and 7. For cryptographic uses it is important that we do not use primes with a known particular form. Thus, for example, we do not limit the choice of candidates to those that are congruent to 1 mod 210, even though they would be easier to compute. A larger table of 2310 values identifying integers relatively prime to 2, 3, 5, 7 and 11 might be used with suitable modifications, but there are diminishing returns as the number of very small primes in the table increases. (Table_210 eliminates all but 48/210 or 22.86% of the candidates, while a larger Table_2310 would eliminate all but 480/2310 or 20.78% of the candidates.) Larger small primes (e.g., 11 through 241) are better tested using trial division rather than table-based smart incrementing.

The small primes test makes use of several tables:

```
Table_SmallPrimes[0..MAX_SMALL_PRIMES -1] = {11, 13, 17,
19, 23, 29, 31, 37, 41, 43, 47, 53, 59, 59, 61, 67, 71,
73, 79, 83, 89, 97, 101, 103, 107, 109, 113, 127, 131,
137, 139, 149, 151, 157, 163, 167, 173, 179, 181, 191,
193, 197, 199, 211, 223, 227, 229, 233, 239, 241};
Table_Reductions[0..MAX_MODULI -1] = {11 * 13 * 17 * 19 *
23 * 29 * 31, 37 * 41 * 43 * 47 * 53, 59 * 61 * 67 * 71 *
73, 79 * 83 * 89 * 97, 101 * 103 * 107 * 109, 113 * 127 *
131 * 137, 139 * 149 * 151 * 157, 163 * 167 * 173 * 179,
181 * 191 * 193 * 197, 199 * 211 * 223 * 227, 229 * 233 *
239 * 241};
Table_SmallPrimesIndexes[0..MAX_MODULI -1] = {0, 7, 12,
17, 21, 25, 29, 33, 37, 41, 45}.
```

The first and second tables are, respectively, a list of the first known prime numbers less than 250 and products of groups of primes from that list. The primes 2, 3, 5 and 7 are left out of the tables, because we assure that the random number "Alea" will not only be odd, but also chosen to be relatively prime to 3, 5, and 7 by using the "SmartIncrement" procedure detailed above. The products in the second list are limited to 32 bits for easier division. (64 bits or even greater products could be used instead, depending on available hardware.) The third "index" table serves to index the list of small primes into consecutive subsets corresponding to the products in the second list.

The table sizes can be extended or reduced, depending on the desired number of tests. The number of tests deemed to be needed is typically based on the bit size of the prime numbers that have to be generated. For larger tables than those given here, it may be more convenient to derive the tables from all numbers relatively prime to 2, 3, 5 and 7, rather than the prime numbers themselves. While a small number of composite numbers would be included in addition to the primes (e.g., 121, 143, 169, 187, 209, 221, and 247 would be added to the above tables), the ease of generating the values for the test may outweigh making the tests slightly longer than absolutely necessary. Again, however, there is a diminishing return on eliminating proven composites by small prime trial division as the list of primes gets longer. The point at which it becomes desired to switch over from trial division to the more rigorous Miller-Rabin, Fermat or some other probable prime testing is a matter of judgment that mainly depends on the bit size of the candidate and the desired security level.

The computer program for the small primes test function may comprise the following:

```
Function SmallPrimesTest(FirstCall : boolean) : Boolean;
Var Composite : Boolean;
Begin
If (FirstCall = True) then
Begin
For Counter := 0 to MAX_MODULI - 1 do
Begin
Table_Mod[Counter] := Alea % Table_Reductions[Counter];
End;
End;
Composite := false;
While (Composite = false) do
Begin
Counter := 0;
While ((Composite = false) and (Counter < MAX_MODULI)) do
Begin
CounterPrimes :=
Table_SmallPrimes[Table_SmallPrimesIndexes[Counter]];
While ((Composite = false) and (CounterPrimes <
Table_SmallPrimesIndexes[Counter + 1])) do
Begin
If (((Table_Mod[Counter] + MainIncrement) %
Table_SmallPrimes[CounterPrimes]) = 0)
Then Composite := true;
Else CounterPrimes := CounterPrimes + 1;
End;
Counter := Counter + 1;
End;
End;
Return Composite;
End;
```

During the first execution of the small primes test, the original large candidate integer Alea is first reduced to a table of much smaller 32 bit integers "Table_Mod" by performing modular division by each one of the prime products in Table_Reductions to obtain a set of 32 bit remainders. These "Table_Mod" entries should be retained by the program for each subsequent call of "SmallPrimesTest", so that the large integer divisions do not need to be recalculated. Trial division is then conducted with the "Table_Mod" entries, after first incrementing by the current trial increment "MainIncrement", using the index table to test the candidate against the same primes that were in the product used for the corresponding reduction, and the remainders are checked. If trial division by any small prime from "Table_SmallPrimes" is zero, then the current candidate is found to be composite, and the value (Composite= true) is returned, without any further trial divisions on that candidate being needed. If the remainder is nonzero for all tested small primes, then the value (Composite=false) is returned, and the main program proceeds to the more rigorous probable primality tests.

Once a candidate has passed all of the tests, it is demonstrated to be probably prime. It is then used by other parts of a cryptographic program for such applications as key generation for asymmetric (public key) block ciphers or for pseudo-random number generation (as in U.S. Pat. No. 4,780,840) for stream cipher communications. Use in generating session keys in smart card transactions is especially relevant, since the faster generation and testing speed allows the present method to be carried out by the single-chip processors placed on smart cards without undue delays.

What is claimed is:

1. A computer-implemented cryptography program stored on a hardware-readable medium, said cryptography program including instructions for generating one or more probable prime candidates for cryptographic use, said program causing processing hardware executing said program to carry out at least the following program steps:

providing a pseudo-random number having a specified first bit size;

generating a first candidate from said pseudo-random number by summing with a first increment, said first increment chosen such that said first candidate is relatively prime to a set of very small primes;

repeatedly testing successive candidates beginning with said first candidate by means of trial division against a list of small primes other than said very small primes until a candidate is found that is relatively prime to all of said small primes in said list, successive candidates being tested by (i) calculating a set of modular reductions of the first candidate, the elements of this set of modular reductions being remainders congruent to the first candidate modulus each of a corresponding set of products of distinct groups of primes in said list of small primes, said products having a specified maximum second bit size that is smaller than said first bit size by at least a factor of four;

(ii) maintaining a main increment value that is updated for each successive candidate, each successive update of the main increment value when added to the value of said first candidate providing the next successive candidate that is relatively prime to the set of very small primes;

(iii) for each element of the set of modular reductions incremented by the current update of the main increment value, unless and until a candidate has been found to be composite, testing the incremented element by trial division against each of the primes in the corresponding group of primes in to determine whether the remainder is zero and if so designating the current candidate as composite;

after finding a candidate that is relatively prime to all of said small primes in said list, subjecting said candidate, equal to the first candidate plus the current main increment, to at least one known rigorous probable primality test, and if a candidate is found to be composite according to any one said rigorous test, then continuing testing of successive candidates by trial division against the list of small primes as before until a candidate is found that passes both small primes trial division and said rigorous test, such candidate being considered to be a probable prime value; and using the probable prime value in said cryptographic program.

2. The program of claim 1 wherein the processing hardware comprises a general purpose programmable computer system and the program is in the form of software readable by said computer system.

3. The program of claim 1 wherein the processing hardware comprises an integrated circuit chip and the program is in the form of firmware accessible by said chip.

4. The program of claim 1 wherein the processing hardware comprises a configurable logic chip, such as a field programmable logic array, configured to implement said program.

5. The program of claim 1 in the form of an application specific integrated circuit specially designed to execute the program steps.

6. The program of claim 1 wherein the first bit size is at least 256 bits.

7. The program of claim 1 wherein the second bit size is 32 bits.

8. The program of claim 1 wherein said set of very small primes comprises 2, 3, 5 and 7.

9. The program of claim 8 wherein said list of small primes comprises all successive primes between 11 and 241.

10. The program of claim 8 wherein said first increment is found by comparing a remainder congruent to the pseudo-random number modulus 210 with a table of 210 elements representing values from zero to 209, wherein elements of the table corresponding to values relatively prime to all of 2, 3, 5 and 7 are distinguished in the table from elements corresponding to values divisible by any of 2, 3, 5 or 7, and the comparing is carried out to identify an increment that will bring said remainder to a value that is relatively prime to all of 2, 3, 5 and 7.

11. The program of claim 10 wherein said main increment is found by comparison with said table of 210 elements, each successive main increment value bringing said remainder to the next relatively prime value in the table.

12. The program of claim 1 wherein said known rigorous probable primality test comprises the Miller-Rabin test.

13. The program of claim 1 wherein said known rigorous probable primality test comprises the Fermat test.

14. The program of claim 1 wherein the probable prime value is used to generate at least one cryptographic key.

\* \* \* \* \*